Oct. 6, 1970 R. S. ROSENAST 3,532,874
DECORATIVE STRUCTURE
Filed Feb. 24, 1969 2 Sheets-Sheet 1
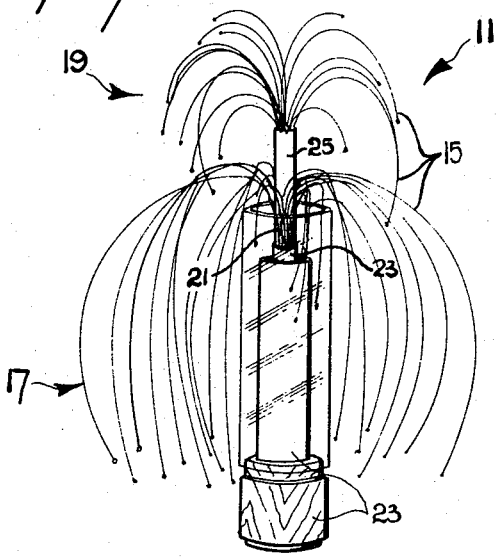
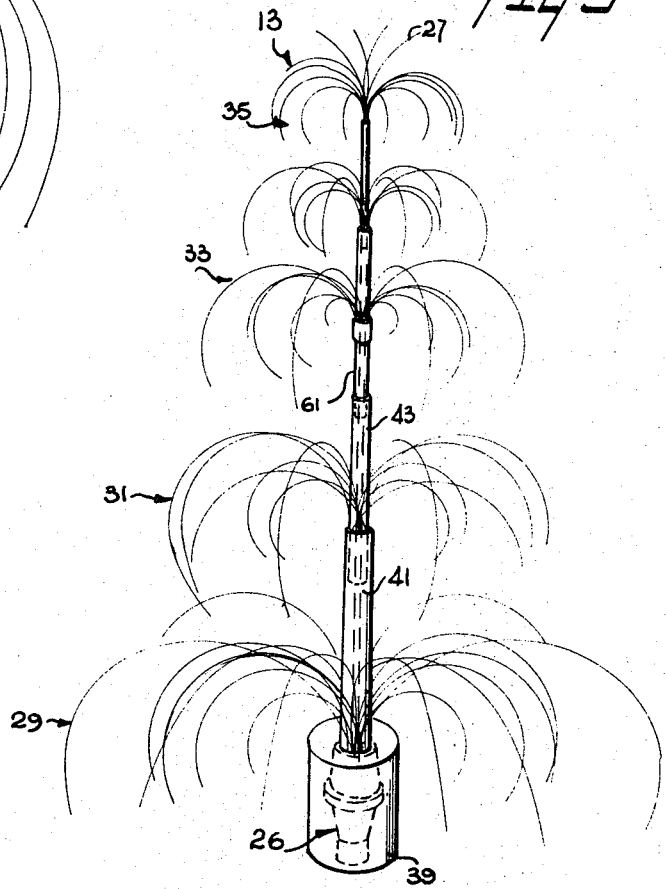
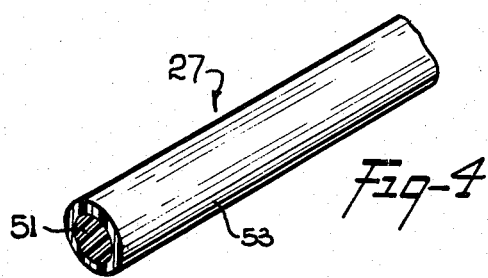
INVENTOR.
ROBERT S. ROSENAST.
BY
Nilsson & Robbins
Attorneys.

Oct. 6, 1970    R. S. ROSENAST    3,532,874
DECORATIVE STRUCTURE
Filed Feb. 24, 1969    2 Sheets-Sheet 2
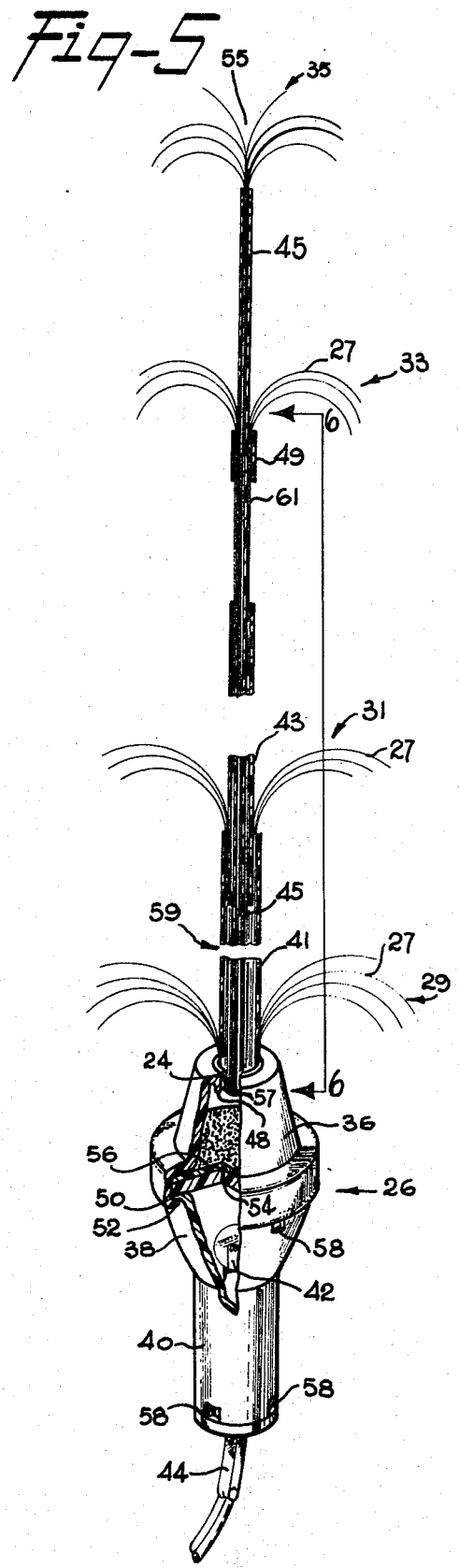
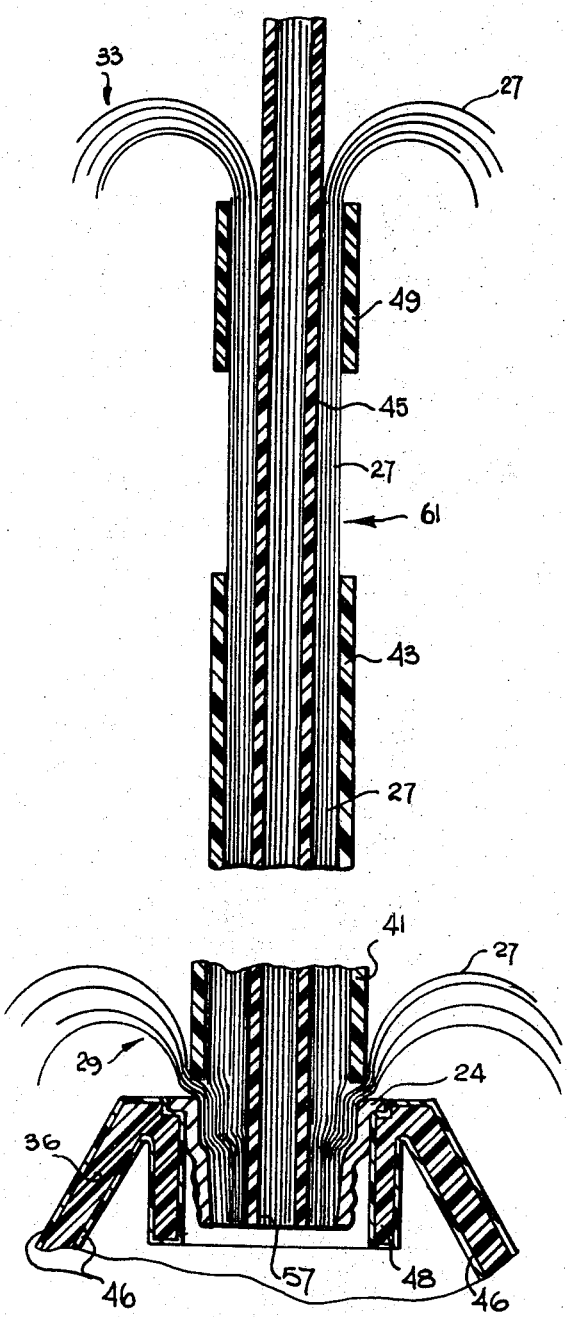
INVENTOR.
ROBERT S. ROSENAST.
BY Nilsson & Robbins
Attorneys.

United States Patent Office 3,532,874
Patented Oct. 6, 1970

3,532,874
DECORATIVE STRUCTURE
Robert S. Rosenast, Newport Beach, Calif., assignor to Poly-Optics, Inc., a corporation of California
Filed Feb. 24, 1969, Ser. No. 801,339
Int. Cl. A47g 33/06
U.S. Cl. 240—10
9 Claims

ABSTRACT OF THE DISCLOSURE

A decorative structure of tiered optical fibres having telescopically positioned tubular members encasing a number of elongate fibres. The outer numbers of fibres flare outwardly from the juncture of the tubular members to form a tier of flared fibres of decreasing extent. The innermost tubular member can extend entirely through the other members to provide support therefor. A light source is provided at the light receiving end of the fibres for illumination of the light emitting ends of the fibres.

BACKGROUND OF THE INVENTION

Field of the invention

The fields of art to which the invention pertains include the fields of optics and radiant energy, particularly with respect to light conducting rods, such as optical fibres, and decorative structures, particularly decorative lights.

Description of the prior art

The advent of modern manufacturing procedures for fabricating plastic as well as glass optical fibres has made such fibres available for decorative purposes. In such utility, the fibres are often bundled together at one end with the fibres at the other end flaring out to form a bouquet of light or branches of smaller bouquets. In order to achieve certain geometrical patterns, it is often desirable to have various tiers or layers of optical fibres spilling or rolling out from a central stem at a plurality of levels. However, a problem arises with respect to maintaining integrity in the stem portion while permitting the individual fibres to spill or flare outwardly therefrom. An initial solution to this problem was to utilize a resin or glue which would cause the fibres to adhere in a bundle with the exception of those which it was desired to have flare outwardly. Although this is workable, many hand operations are required to apply the adhesive and then maintain the same in a given position until cured. Furthermore, unless carefully applied, the adhesive tends to clog or run, detracting from the overall aesthetic appearance of the device. Accordingly, the need exists for means for maintaining the integrity of a long bundle of optical fibres or the like, but allowing intermediate portions thereof to spray or spill outwardly.

SUMMARY OF THE INVENTION

The present invention provides a means for maintaining the integrity of an elongate bundle of fibres, yet allows spillovers and flared sprays to be formed at any desired intervals. A decorative structure of tiered fibres is provided and integrity obtained by means of a plurality of tubular members disposed coaxially with end portions thereof telescopically disposed. A bundle of elongate fibres is arranged to run through the tubular members so that successive exterior pluralities of such fibres extend through the telescopic connections to spill-over at intermediate portions. Thus, a first plurality of elongate fibres is disposed along the axis of and within the plurality of tubular members. A second plurality of elongate fibres is disposed along the axis of and within the first tubular member but extends entirely exteriorly of the second tubular member at the telescopically disposed portion thereof to flare outwardly from the exterior surface of the second tubular member. This relationship continues for a plurality of tandemly arranged telescopically connected tubular members to form a tier of flared fibres of decreasing extent. In a particular embodiment, and to provide firm support for the telescopic members, the centermost tubular member extends entirely through the other tubular members. In other particular embodiments, one or more sleeves are included that are slidably disposed on one or more of the tubular members and further encase the fibres that are exteriorly disposed on that tubular member. By sliding the sleeve upwardly or downwardly, the flaring or spill-over point of the fibres can be raised or lowered, respectively.

In further embodiments, the tubular members are transparent and the fibres are optical fibres having light emitting flared ends and light receiving faces at the other ends thereof. An illumination member is provided for holding and illuminating the fibre end faces and comprises a housing, a light source within the housing and means in the path of light from the light source for receiving the fibre faces to be illuminated. In still further embodiments, the optical fibres are selected so as to have a diameter of at least 7 mils.

BRIEF DESCRIPTION OF THE DRAWINGS

FIG. 1 is a perspective view of a decorative device structured in accordance with this invention;

FIG. 2 is a perspective view of another decorative device, simulating a Christmas tree, structured in accordance with this invention;

FIG. 3 is a perspective view of still another decorative device, also simulating a Christmas tree, structured in accordance with this invention;

FIG. 4 is a perspective view of an optical fibre utilized in this invention;

FIG. 5 is a combined perspective and cross-sectional, broken and simplified view of the device of FIG. 3, and an illumination member therefor; and FIG. 6 is an enlarged cross-sectional view of the decorative structure of FIG. 5, taken on lines 6—6 of FIG. 5, in the direction of the arrows.

DESCRIPTION OF THE PREFERRED EMBODIMENTS

Referring to FIGS. 1, 2 and 3, there are shown decorative devices 11, 12 and 13, respectively, utilizing structural arrangements in accordance with this invention. In FIG. 1, a tower of optical fibres 15 is provided in two layers or tiers 17 and 19 extending from a central stem 21, which stem 21 projects from a lamp base 23, housing illumination means as will be described further below. The stem 21 is encased within two coaxial and telescopically disposed tubular members 23 and 25. The lower tier 17 of flared fibres extends outwardly from the telescopic juncture between the lower, outer tubular member 23 and the inner tubular member 25, the second tier 19 being formed by the fibres 15 flaring out from the far end of the inner tubular member 25. The manner in which the tubular members are telescopically disposed and the relation of fibres thereto will be amplified on further below.

Referring to FIG. 2, the decorative structure 12 shown there is in a form simulating a short Christmas tree wherein 200 optical fibres 14, each about 12 inches long, are flared to form three tiers 16, 18 and 20 of decreasing extent. In construction, 100 of the optical fibres 14 are assembled in an eyelet (not shown, but similar to the eyelet 24 of FIGS. 5 and 6) and fanned out over 360°. Fifty of the optical fibres 14 are assembled in a ⅜ inch diameter plastic tube 22 which is 4 inches long and fanned out from one end over 360°. The remaining optical fibres are assembled in a ⅛ inch diameter tube which is 8 inches long and fanned out over 360°. The fibres extending from the unflared end of the ⅜ inch tube are then fed into the eyelet, but the ⅜ inch tube 22 itself is not fed into the eyelet. The fibres extending from the unflared end of the ⅛ inch tube and that end of the ⅛ inch tube are fed through the ⅜ inch tube 22 into the eyelet. The eyelet is crimped to secure the fibres 14 and ⅛ inch tube therein and inserted in an illumination device 30, serving as a base within a housing 32, as will be further detailed in FIGS. 5 and 6.

Referring to FIG. 3, the decorative structure 13 shown there is also in a form simulating a Christmas tree but wherein the fibres 27 are flared to form four tiers 29, 31, 33 and 35 of deceasing extent. A base 39 is provided from which extends three tubular members 41, 43 and 45 which are coaxially and telescopically disposed to form an integral stem for the fibres 27. The central tubular member 45 extends entirely through the other tubular members 41 and 43. An eyelet 24 (more clearly shown in FIGS. 4 and 5) receives the bundled lower ends of the fibres 27 and lower end of the central tubular member 45 and secures them within a light source 26, shown in shadow in FIG. 2. The light source 26 is contained within the base 39 and provides a means for illuminating the optical fibres 27, as hereinafter further described, so that light is emitted from the flared ends thereof. One or more sleeves 49 can be provided to slide along a tubular member to slide the point of flaring of the fibres up or down the stem as desired. The tubular members 41, 43 and 45 effectuate a tiered array of flared fibre sprays that provide a decorative Christmas tree structure. By utilizing optical fibres and illumination means therefor, a dramatic and unique illumination effect is obtained.

The tubular members 41, 43 and 45 can be disposed in tandem fashion so that only their ends are telescopically connected, rather than having a central member (as 45). However, the arrangement shown provides firm central support for the entire column enabling a more rigid constuction.

Referring to FIG. 4, each optical fibre 27 comprises a central light conducting core 51 encased within a light reflecting jacket 53. The optical fibre 27 is constructed of materials well known to the art wherein the light conducting core 51 has a higher index of refraction than the jacket 53. For example, a core 51 can be formed of polystyrene having an index of refraction of 1.60 and the jacket 53 can be formed of a polymethylmethacrylate having an index of refraction of 1.49. Methods for forming such fibres are well known in the art. A balance must be struck between flexibility of the optical fibres 27 and light emitting capability. The fibres must be sufficiently flexible to allow the formation of decorative spray shapes in a variety of forms, and yet the fibres must emit sufficient light to be decoratively aesthetic. To obtain an aesthetically attractive display one should utilize optical fibres wherein each has a diameter of at least 7 mils. An aesthetic balance between flexibility and intensity of light emission is not obtained with optical fibres of smaller diameter than 7 mils.

Referring to FIGS. 5 and 6, the telescopically disposed tubular members 41, 43 and 45 of FIG. 3 and light source 26 are depicted in more detail; the lengths of tubing are broken and the depiction shortened for purposes of clearer illustration. FIG. 5 depicts details of the light source 26. FIG. 6 shows enlargements of portions of the tubular members and connection to the light source of FIG. 5.

Each of the optical fibres 27 are of approximately the same length and a central core 55 of a plurality thereof extends through all of the tubular members 41, 43 and 45 to terminate in the uppermost spray 35 emanating from the top of the structure. The lowermost ends of that core of fibres 55 as well as the lowermost ends of those fibres 27 constituting the intermediate flared sprays 31, 33 and 35 are disposed internally of the outermost tubular member 41. The central tubular member 45 is received in the eyelet 24 and the lower end of the outermost tubular member 41 is disposed just exteriorly of the eyelet 24 in the manner described with respect to FIG. 2. The optical fibres 27 constituting the lowermost flared spray 29 are disposed with their ends wedged between the eyelet 24 and central tubular member 45 and other fibres 27 thereat to flare outwardly 360° at that juncture.

The eyelet 24 is of metal and is an integal part of the illumination device depicted in FIG. 5, which device is disclosed in application Ser. No. 762,832, by J. P. Bruce and R. S. Rosenast, filed Sept. 26, 1968. The light source 26 includes a housing having an anterior member 36 and a posterior member 38. The posterior member 38 terminates in a shank portion 40 which houses a small light bulb 42 and socket therefor (not shown) an electrical cord 44 operatively associated with the socket protrudes rearwardly from the shank portion 40. The bulb 42 is positioned within the posterior member 38, but forwardly of the shank portion 40 thereof. The posterior member 38 of the housing is shaped elliptically, that is, a longitudinal cross-section thereof as in the form of a section of an ellipse. The entire housing is coated inside and out with a highly light reflecting material 46, such as aluminum, so that there is provided an elliptically shaped reflective inner surface in the posterior member 38 to concentrate light from the bulb 42 to a forward point of the anterior member 36. This point corresponds to the position of the bundled ends of the optical fibres to the position of the bundled ends of the optical fibres 27. The eyelet 24, encasing the central tubular member 45 and wedged fibres 27 thereat, is secured at the forward end of the anterior member 36 within a ribbed cylindrical member 48, the eyelet 24 includes an annular flange spaced from the bottom of the central tubular member 45, for purposes of limiting intrusion of the tubular member 45 into the ribbed housing cylindrical member 48.

The forward end of the posterior housing member 38 is provided with an annular flange 50 thereon which fits within an annular groove 52 on the inner surface of the anterior housing member 36 adjacent to the rearward end thereof and abuts the rear edge of the grooved material. The groove 52 is wide enough to accommodate not only the relatively narrow flange 50, but also a somewhat thicker disk 54 and a thin circular color filter 56. The disk 54 is of clear glass or plastic and is operable to pass light therethrough while reflecting heat from its rear surface. The disk 54 and filter 56 are secured within the groove 52, pressed therein by the posterior housing member flange 50. Any of a variety of color filters 56 can be utilized to provide any color of light desired at the tips of the optical fibres 27, or a filter having a plurality of colors thereon can be utilized for special effects. The filter 56 can be omitted and only a clear heat reflecting disk utilized; alternatively, the heat reflecting disk 54 can be made of light filtering material and function both as a light filter and heat reflector to thereby impinge light of desired color on the bundled ends of the optical fibres 27. A plurality of vent openings 54 are disposed around the flanged forward end of the posterior housing member 38 and rear end of the shank portion 40 to facilitate the flow of air and cooling of the light source.

The tubular members 41, 43 and 45 are of clear plastic, but may be opaque for specific design purposes. The central tubular member 45 is secured within the eyelet 24 and extends through the other tubular members 41 and 43 to provide stability for the overall stem. As noted, the eyelet 24 is inserted into the light source 26 which is secured within the case 39 of the ornamental device as disclosed in FIG. 3. The plurality of fibres 27 within the outermost tubular member 41, but exterior of the central tubular member 45, extend upwardly therefrom. (Note that the fibres can be progressively separated by successive additional tubular members, each of decreasing diameter and telescopically received in tandem fashion one into the other.) After some predetermined and variable distance of extension upwardly, as indicated by the break 59, the second clear tubular member 43 has a plurality of the optical fibres 27, but a lesser number thereof extending therethrough. An overlap is provided between the outermost tubular member 41 and the second tubular member 43. In the absence of the central tubular member 45, this overlap would be sufficient to maintain integrity of the central column of the structure. Those optical fibres 27 not continuing through the second tubular member 43 extend through the the space between the inner surface of the outermost tubular member 41 and the outer surface of the second tubular member 43, thus resulting in a spillover of optical fibres to form the flared spray 31 thereat. The spill-over occurs entirely around the circumference of the second tubular member 43, thus causing the appearance of a spray extending outwardly from a central column.

The fibres 27 extending through the second tubular member 43 but extending exteriorly of the central tubular member 45 can flare outwardly at the upper end of the second tubular member 43 or can extend through a sleeve 49, as described below, to extend therefrom. The remaining fibres 27 extending entirely through the central tubular member 45 flare outwardly from the top thereof. Any number of tubular members may be similarly utilized to provide structures of any desired height within the limits of the geometry dictated by the minimum size of the optical fibres of 7 mils.

If desired, one or more bands or sleeves 49 of tubing material can be slidably disposed on one or more of the tubular members, e.g., on 45 as in FIG. 5. By such means, the extent of flaring and the point at which flaring occurs, can be varied by appropriate sliding of the sleeve 49 upwardly or downwardly on the tubular member 45. The length of the band or sleeve 49 should be sufficient to avoid bulging of the unsupported section 61 of the fibres 27, which bulging could detract from the overall aesthetic appearance of the structure.

What is claimed is:
1. A decorative structure, comprising:
 a plurality of flexible optical fibers, each having a light receiving end and a light emitting end;
 at least first and second tubular members disposed coaxially with an end portion of said second tubular member telescopically within at least an end portion of said first tubular member, said tubular members being rigid relative to said fibers whereby to support said fibers;
 a first portion of said plurality of optical fibers disposed along said axis in said first and second tubular members;
 a second portion of said plurality of optical fibers disposed along said axis in said first tubular member but extending entirely exteriorly of said second tubular member for light emitting ends thereof to flare outwardly;
 a light source; and
 means for holding the light receiving ends of said first and second portions of optical fibers in the light path of said light source for simultaneous illumination thereof.

2. A decorative structure of tiered, flexible optical fibers, comprising:
 at least first and second tubular members disposed coaxially with an end portion of said second tubular member telescopically within at least an end portion of said first tubular member and being rigid relative to said fibers whereby to support said fibers;

a first plurality of elongate, flexible optical fibers disposed along said axis in said first and second tubular members;
 a second plurality of elongate, flexible optical fibers disposed along said axis in said first tubular member but extending entirely exteriorly of said second tubular member to flare outwardly;
 one or more additional tubular members disposed in telescopic fashion with said second tubular member, selected fibers of said first plurality of elongate fibers etxending through one or more of said additional tubular members and other fibers of said first plurality of fibers successively extending entirely exteriorly at successively telescopically disposed portions of said additional tubular members to flare outwardly from the exterior surfaces thereof to form a tier of flared fibers of decreasing extent;
 a light source; and
 means for holding the light receiving ends of said optical fibers in the light path of said light source for illumination thereof.

3. A decorative structure of tiered, flexible optical fibers, comprising:
 at least first and second tubular members disposed coaxially with an end portion of said second tubular member telescopically within at least an end portion of said first tubular member and being rigid relative to said fibers whereby to support said fibers;
 a first plurality of elongate, flexible optical fibers disposed along said axis in said first and second tubular members;
 a second plurality of elongate, flexible optical fibers disposed along said axis in said first tubular member but extending entirely exteriorly of said second tubular member to flare outwardly;
 a sleeve slidably disposed on said second tubular member, at least a number of said second plurality of fibers extending through said sleeve to flare outwardly at the far end thereof from the exterior surface of said second tubular member;
 a light source; and
 means for holding the light receiving ends of said optical fibers in the light path of said light source for illumination thereof.

4. The structure of claim 1, wherein said tubular members are transparent.

5. The structure of claim 1, including a base and means for securing to said base the unflared ends of at least said first plurality of fibres.

6. The structure of claim 1, wherein said second tubular member extends entirely through said first tubular member.

7. The structure of claim 2, wherein said second tubular member extends entirely through each of said additional tubular members.

8. A decorative structure of tiered, flexible optical fibers, comprising:
 a base;
 at least first and second elongate rigid tubular members, each disposed vertically from said base and coaxially with said end portion of said second tubular member telescopically within at least an end portion of said first tubular member;
 a first plurality of elongate, flexible optical fibers disposed along said axis in said first and second tubular members;
 a second plurality of elongate, flexible optical fibers disposed along said axis in said first tubular member but extending entirely exteriorly of said second tubular member at said telescopically disposed portion thereof to flare outwardly from the exterior surface of said second tubular member; and
 means for illuminating the light receiving ends of said optical fibers.

9. The structure of claim 8 wherein said optical fibres each have a diameter of at least 7 mils.

References Cited

UNITED STATES PATENTS

| | | | |
|---|---|---|---|
| 3,068,739 | 12/1962 | Hicks et al. | 350—96 |
| 3,431,410 | 3/1969 | Dolan et al. | 240—10 XR |
| 3,423,581 | 1/1969 | Baer. | |
| 3,455,622 | 7/1969 | Cooper | 350—96 XR |

FOREIGN PATENTS 303,270  1/1929  Great Britain.

NORTON ANSHER, Primary Examiner

R. P. GREINER, Assistant Examiner

U.S. Cl. X.R.

240—1; 350—96